July 7, 1936.   R. J. GRAY   2,047,142
LUBRICATING MEANS
Filed June 26, 1933
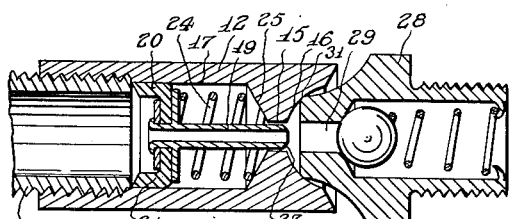
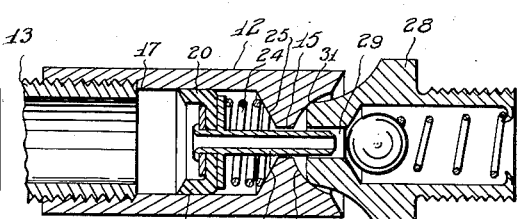
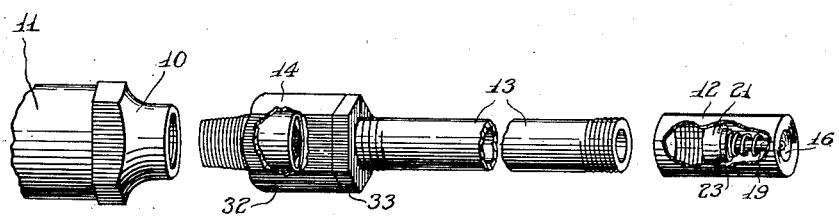
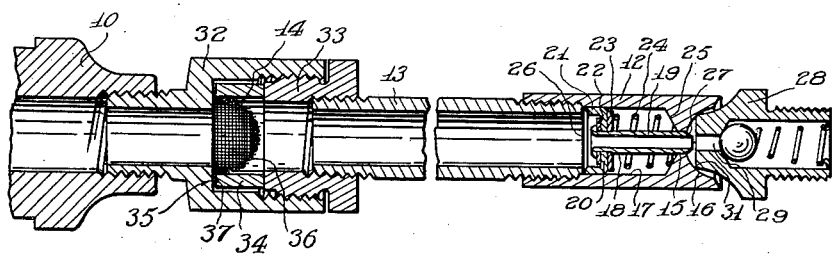
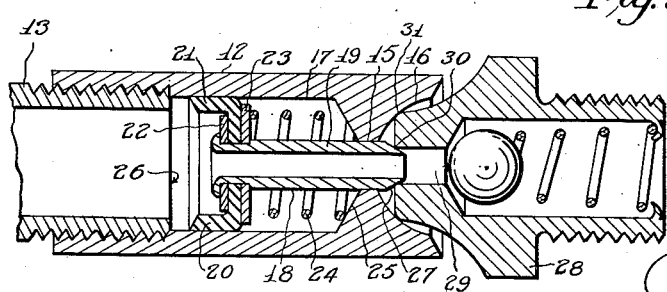
Inventor
Russell J. Gray
BY Leonard L. Kalish
Attorney Patented July 7, 1936

2,047,142

UNITED STATES PATENT OFFICE 2,047,142

LUBRICATING MEANS

Russell J. Gray, Minneapolis, Minn.

Application June 26, 1933, Serial No. 677,710

12 Claims. (Cl. 285—161)

My invention relates to new and useful lubricating means, and it relates more particularly to high pressure lubricating means, whereby lubricant may be delivered from a high pressure grease-gun to a lubricant receiving member or grease receptacle or so-called "nipple" or "fitting" carried by the bearings to be lubricated or affixed to or forming a part of the lubricant duct leading to the bearing to be lubricated.

My invention is applicable to the lubrication or the delivery of lubricant under high pressure into grease cups or so-called "fittings" or "nipples" of the general type to which the grease-gun is not positively connected by screw thread, bayonet joint or the like, but to which the lubricant is delivered from the grease-gun merely through a manually maintained contact, as for instance, by pushing the discharge nozzle of the grease-gun against the "fitting" while discharging lubricant and in which the nozzle may be adapted to make a metal-to-metal contact with the "fitting" or "nipple", and my invention is also applicable to the lubrication or the delivery of lubricant under high pressure into the grease-cups or so-called "fittings" or "nipples" of the class to which the grease-gun is mechanically attached by some quickly attachable and quickly detachable interlocking connection as, for instance, a bayonet connection, screw connection, "chuck" type connector, or the like.

Thus, while my present invention may be utilized without any attaching type of connector between "fitting" and grease-gun nozzle, it will readily be understood that mechanical attaching means or connector means may be superadded to the "fitting" and nozzle embodying my present invention as, for instance, by providing the nipple with an external undercut locking shoulder as on the lubricant receiving members shown in United States Patents Nos. 1,150,420; 1,322,357; Re. 18,278; 1,315,484; 1,369,687; 1,435,103; 1,468,-732; 1,593,791; or 1,711,870, and by surrounding the sealing members by the shoulder-engaging or groove-engaging interlocking means of the types or class shown in these patents.

One general type of "fitting" referred to is the type of "fitting" or grease cup shown in Patent No. 1,475,980, particularly in Figures 1, 2, 3, and 6 of the drawing of said patent, and the grease-gun referred to may be any grease-gun such as shown in the Patent No. 1,475,980, or of the type shown in applicant's Patent No. 1,790,914, dated February 3, 1931 and application Serial No. 527,164 dated April 2, 1931.

The purpose of the present invention is to form an auxiliary metal-to-metal seal between the fitting and the nozzle which may be inoperative at low pressures but which will automatically come into action whenever the pressure of the lubricant is increased to a point where the initial or primary metal-to-metal contact between "fitting" and "nozzle" may be insufficient to withstand the high pressure, and said high pressure would otherwise tend to cause a leakage of lubricant or grease between the "fitting" and the "nozzle".

With the above and other objects in view which may appear more fully from the following detailed description, my invention may be embodied in a novel combination of lubricant receptacle, grease-cup or "fitting", adapted to be affixed to the lubricant ducts of the bearings to be lubricated, a grease gun or grease dispensing device adapted to develop relatively high pressures; a generally tubular nozzle, connector, or the like carried on the discharge end of said grease-gun or lubricant dispensing device (or the conduit or hose leading therefrom); coacting contact portions on the "fitting" and nozzle adapted for sealing contact with each other, each preferably formed of metal and preferably adapted to contact with each other along a circle, a piston-like member operatively mounted within the nozzle, which piston-like member may be urged away from the discharge end thereof by a spring acting upon the piston, and a tubular plunger-like sealing member carried by said piston and extending therethrough or operatively connected or associated therewith, and extending through the discharge opening in the nozzle, and having an outer end adapted to be projected into the intake opening of the grease cup or "fitting", and to form a secondary, fluid-pressure-intensified seal therewith of a diameter substantially less than the diameter of the primary seal. If a retracting spring is employed to urge the piston-like member and the plunger-like sealing member away from or rearwardly of the discharge end of the tubular nozzle member, then the piston-like member and the plunger-like sealing member (mounted within the nozzle) will make a sealing contact with the intake opening of the "fitting" whenever the pressure of the lubricant within the nozzle is sufficient to displace the piston-like member against the force of the retracting spring, which tends to keep the piston and plunger in a retracted or inoperative position.

My invention may also be embodied in other variant constructions and arrangements and may consist of other novel features and details of construction, which may further appear from the following detailed description.

For the purpose of illustrating my invention, I have shown in the accompanying drawing, forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawing, in which like reference characters indicate like parts:—

Figure 1 represents a longitudinal sectional view of the discharge end of a grease gun and the nozzle and associated elements connected therewith, shown in relation to the "fitting".

Figure 2 represents a perspective view of the nozzle, filter and grease gun, shown separated or dis-assembled, with parts partly broken away.

Figure 3 is an enlarged sectional view of the nozzle and fitting shown in Figure 1, showing the piston and the secondary-seal plunger in the operative position.

Figure 4 represents a slightly modified form of construction embodying my invention.

Figure 5 represents a similar view to that shown in Figure 4 by illustrating the secondary-seal plunger in an operative position.

My invention is applicable either to the so-called hand-type high pressure grease guns, of the character illustrated in Patent No. 1,475,980, and in applicant's prior Patent No. 1,790,914, dated February 3, 1931, and co-pending application Serial No. 527,164 dated April 2, 1931, or it may be used in combination with high pressure lubricating devices of various other types, as for instance, the type wherein grease pressure is generated at a remote point, and the grease under pressure is conveyed through pipe lines or hose lines to a manually operable release valve to the end of which the discharge nozzle is connected, as for instance, the type of high pressure lubricating means illustrated in Patents Nos. 1,633,304 dated June 21, 1927 and 1,694,096 dated December 4, 1928.

To the discharge end 10 of the grease gun or other high pressure grease delivery device, I connect a "contact"-nozzle 12, either directly or through an intermediate conduit, such as the pipe 13, and preferably also through the strainer device 14 shown particularly in Figures 1 and 2.

The contact-nozzle 12 is provided with a generally axial opening 15, of relatively small diameter, and the primary contact surface or contact portion 16, which in the particular illustration shown, is a concavely spherical surface, although the form of this primary contact portion or surface may be varied somewhat.

The interior of the contact nozzle 12 is provided with a generally cylindrical bore 17, coaxial with respect to the opening 15. Within the generally cylindrical bore 17, a piston and plunger assembly 18 is operatively mounted. The piston and plunger assembly 18 includes a thin tubular metallic plunger 19, the rear end of which extends through and is riveted or otherwise fixedly secured to the piston 20, which may consist of a small cup-shaped or flanged leather washer 21, having its plane portion confined between two metallic discs or washers 22 and 23.

A helical compression spring 24 may be interposed between the piston 20 and the shoulder 25 within the nozzle, and this spring tends yieldably to retain the piston 20 and the secondary-seal plunger 19 in the inoperative or retracted position shown, for instance, in Figure 1. The retracted position of the piston and plunger may be fixed by the inner end 26 of the pipe 13. In the retracted position of the piston and plunger 20 and 19, the outer and slightly tapered end 27 of the plunger 19 is so disposed within the opening 15 of the nozzle 12, that it clears the receiving end of the fitting 28 in all angular relations or operative relations of the nozzle and fitting. The plunger is either made of an external diameter slightly greater than the diameter of the intake opening 29 of the fitting 28, as for instance in Figures 1 and 3, and the end thereof slightly tapered conically or spherically or the plunger may be made of a diameter slightly less than the diameter of the intake opening 29, so as to slide into said opening to a suitable extent, as shown in Figures 4 and 5.

In the modification shown in Figures 1 and 3, the secondary seal is formed between the convex conical or spherical or otherwise tapered end 27 of the plunger 19, and the circular edge 30 of the inlet opening 29 of the "fitting" or the lubricant receptacle.

In the modification shown in Figures 4 and 5, the secondary seal is established by the projection of the plunger 19 into the inlet opening 29 to a suitable extent, with the plunger fitting said opening sufficiently closely to prevent any substantial leakage.

Thus, the primary seal is first established between the circular contact edge 31 of the fitting 28, by pressing the rigid nozzle 12 against the fitting. As the pressure increases, however, due to the resistance of the bearing, or for any other reason, the plunger is advanced until it establishes the secondary seal above mentioned. The circular edge 31 may either be a sharp circular edge or it may be slightly tapered, rounded or otherwise chamfered.

The strainer 14 is formed of the outer housing 32, and the tubular plug 33 which is threaded thereinto and which clamps the annular screen retaining member 34 tightly against the shoulder 35. The screen 36 is formed of wire gauze of suitable fineness and is pressed out generally spherically in the direction of the flow of the lubricant with an annular flange 37 soldered or otherwise secured to the annular edge of the retainer member 34. The screen 36 serves to guard the finely bored plunger 19, from being clogged up with any fine foreign particles contained within the lubricant.

I am aware that the invention may be embodied in other specific forms without departing from the spirit or essential attributes thereof, and I therefore desire that present embodiments to be considered in all respects as illustrative and not restrictive, reference being had to the appended claims rather than to the foregoing description to indicate the scope of the invention.

Having thus described my invention, what I hereby claim as new, and desire to secure by Letters Patent, is:

1. In lubricant dispensing apparatus, the combination with a lubricant receptacle affixed to the lubricant duct of the bearing to be lubricated, having an inlet opening of small diameter and having a contact seal portion concentrically surrounding said inlet opening, and being of relatively larger diameter, of a hollow tubular discharge nozzle operatively connected with a lubricant pump, said nozzle having a generally cylindrical bore therein, a generally concentric discharge opening in communication therewith and of relatively smaller diameter, and having a contact seal portion concentrically surrounding said discharge opening and of relatively larger diameter, and adapted to coact with the contact seal portion of said lubricant receptacle when the nozzle is pressed against said lubricant receptacle, and a piston operatively disposed within said cylindrical bore of said nozzle, a tubular plunger operatively connected with said piston and extending through the discharge opening of said nozzle, and adapted to coact with the inlet opening of said lubricant receptacle to establish a secondary seal under the influence of the pressure of the lubricant within the nozzle.

2. In lubricant dispensing apparatus, the combination with a lubricant receptacle affixed to the lubricant duct of the bearing to be lubricated, having an inlet opening of small diameter and having a contact seal portion concentrically surrounding said inlet opening, and being of relatively larger diameter, of a hollow tubular discharge nozzle operatively connected with a lubricant pump, said nozzle having a generally cylindrical bore therein, a generally concentric discharge opening in communication therewith and a relatively smaller diameter, and having a contact seal portion concentrically surrounding said discharge opening and of relatively larger diameter, and adapted to coact with the contact seal portion of said lubricant receptacle when the nozzle is pressed against said lubricant receptacle, and a piston operatively disposed within said cylindrical bore of said nozzle, a tubular plunger operatively connected with said piston and extending through the discharge opening of said nozzle, and adapted to coact with the inlet opening of said lubricant receptacle to establish a secondary seal under the influence of the pressure of the lubricant within the nozzle, and a spring operatively interposed between said piston and the nozzle for exerting a force upon said piston and plunger tending to hold the same in a retracted and inoperative position.

3. In lubricant dispensing apparatus, the combination with a lubricant receptacle affixed to the lubricant duct of the bearing to be lubricated, having an inlet opening of small diameter and having a contact seal portion concentrically surrounding said inlet opening, and being of relatively larger diameter, of a hollow tubular discharge nozzle operatively connected with a lubricant pump, said nozzle having a generally cylindrical bore therein, a generally concentric discharge opening in communication therewith and of relatively smaller diameter, and having a contact seal portion concentrically surrounding said discharge opening and of relatively larger diameter, and adapted to coact with the contact seal portion of said lubricant receptacle when the nozzle is pressed against said lubricant receptacle, and a piston operatively disposed within said cylindrical bore of said nozzle, a tubular plunger operatively connected with said piston and extending through the discharge opening of said nozzle, and adapted to coact with the inlet opening of said lubricant receptacle to establish a secondary seal under the influence of the pressure of the lubricant within the nozzle, and a strainer operatively interposed between said pump and said tubular plunger.

4. In lubricant dispensing apparatus, the combination with a lubricant receptacle affixed to the lubricant duct of the bearing to be lubricated, having an inlet opening of small diameter and having a contact seal portion concentrically surrounding said inlet opening, and being of relatively larger diameter, of a hollow tubular discharge nozzle operatively connected with a lubricant pump, said nozzle having a generally cylindrical bore therein, a generally concentric discharge opening in communication therewith and of relatively smaller diameter, and having a contact seal portion concentrically surrounding said discharge opening and of relatively larger diameter, and adapted to coact with the contact seal portion of said lubricant receptacle when the nozzle is pressed against said lubricant receptacle, and a piston operatively disposed within said cylindrical bore of said nozzle, a tubular plunger operatively connected with said piston and extending through the discharge opening of said nozzle, and adapted to coact with the inlet opening of said lubricant receptacle to establish a secondary seal under the influence of the pressure of the lubricant within the nozzle, and a spring operatively interposed between said piston and the nozzle for exerting a force upon said piston and plunger tending to hold the same in a retracted and inoperative position, and a strainer operatively interposed between said pump and said tubular plunger.

5. In lubricant dispensing apparatus, the combination with a lubricant receptacle affixed to the lubricant duct of the bearing to be lubricated, having an inlet opening of small diameter and having a contact seal portion concentrically surrounding said inlet opening, and being of relatively larger diameter, of a hollow tubular discharge nozzle operatively connected with a lubricant pump, said nozzle having a generally cylindrical bore therein, a generally concentric discharge opening in communication therewith and of relatively smaller diameter, and having a contact seal portion concentrically surrounding said discharge opening and of relatively larger diameter, and adapted to coact with the contact seal portion of said lubricant receptacle when the nozzle is pressed against said lubricant receptacle, and a piston operatively disposed within said cylindrical bore of said nozzle, a tubular plunger operatively connected with said piston and extending through the discharge opening of said nozzle, having the free end thereof externally chamfered and adapted to coact with the circular edge of the inlet opening of said lubricant receptacle to establish a secondary seal under the influence of the pressure of the lubricant within the nozzle.

6. In lubricant dispensing apparatus, the combination with a lubricant receptacle affixed to the lubricant duct of the bearing to be lubricated, having an inlet opening of small diameter and having a contact seal portion concentrically surrounding said inlet opening, and being of relatively larger diameter, of a hollow tubular discharge nozzle operatively connected with a lubricant pump, said nozzle having a generally cylindrical bore therein, a generally concentric discharge opening in communication therewith and of relatively smaller diameter, and having a contact seal portion concentrically surrounding said discharge opening and of relatively larger diameter, and adapted to coact with the contact seal portion of said lubricant receptacle when the nozzle is pressed against said lubricant receptacle, and a piston operatively disposed within said cylindrical bore of said nozzle, a tubular plunger operatively connected with said piston and extending through the discharge opening of said nozzle, having the free end thereof externally chamfered and adapted to coact with the circular edge of the inlet opening of said lubricant receptacle to establish a secondary seal under the influence of the pressure of the lubricant within the nozzle, and a spring operatively interposed between said piston and the nozzle for exerting a force upon said piston and plunger tending to hold the same in a retracted and inoperative position.

7. In high pressure lubricant dispensing apparatus, the combination of a lubricant receiving fitting having an inlet opening of relatively small diameter, and having a generally circular sealing portion of relatively larger diameter concentrically surrounding said inlet opening, a generally hollow tubular nozzle operatively connected with a lubricant pump, having a concave contact surface for sealing engagement with said circular sealing portion, and a lubricant-pressed sealing member reciprocable in said nozzle and having a tip of sufficiently small diameter that it may be projected into the inlet opening of said fitting, at least in part, and to make the sealing contact with the edge surrounding said inlet opening, and a piston for forcing said sealing member into engagement with said fitting.

8. In high pressure lubricant dispensing apparatus, the combination of a lubricant receiving fitting having an inlet opening of relatively small diameter, and having a generally circular sealing portion of relatively larger diameter concentrically surrounding said inlet opening, a generally hollow tubular nozzle operatively connected with a lubricant pump, having a concave contact surface for sealing engagement with said circular sealing portion, and a lubricant-pressed sealing member reciprocable in said nozzle and having a tip of sufficiently small diameter that it may be projected into the inlet opening of said fitting, at least in part, and to make the sealing contact with the edge surrounding said inlet opening, a piston for forcing said sealing member into engagement with said fitting, and resilient means to move said sealing member away from said fitting upon relief of pressure on the lubricant.

9. In high pressure lubricant dispensing apparatus, the combination of a lubricant receiving fitting having an inlet opening of relatively small diameter, and having a generally circular sealing portion of relatively larger diameter concentrically surrounding said inlet opening, a generally hollow tubular nozzle operatively connected with a lubricant pump, having a spherical concave contact surface for sealing engagement with said circular sealing portion, and a lubricant-pressed sealing member reciprocable in said nozzle and having a tapered tip of sufficiently small diameter that it may be projected into the inlet opening of said fitting, at least in part, and to make the sealing contact with the edge surrounding said inlet opening, and a piston for forcing said sealing member into engagement with said fitting.

10. In high pressure lubricant dispensing apparatus, the combination of a lubricant receiving fitting having an inlet opening of relatively small diameter, and having a generally circular sealing portion of relatively larger diameter concentrically surrounding said inlet opening, a generally hollow tubular nozzle operatively connected with a lubricant pump, having a spherical concave contact surface for sealing engagement with said circular sealing portion, and a lubricant-pressed sealing member reciprocable in said nozzle and having a tapered tip of sufficiently small diameter that it may be projected into the inlet opening of said fitting, at least in part, and to make the sealing contact with the edge surrounding said inlet opening, a piston for forcing said sealing member into engagement with said fitting and resilient means to move said sealing member away from said fitting upon relief of pressure on the lubricant.

11. In high pressure lubricant dispensing apparatus for servicing lubricant-receiving fittings having inlet openings of relatively small diameter and having generally circular sealing portions of relatively larger diameter concentrically surrounding said inlet openings, means for making a sealed connection with said fitting including a generally hollow tubular sealing member having a concave contact surface for sealing engagement with said circular sealing portions of said fittings, and a generally tubular lubricant-pressed sealing member reciprocable in said first-mentioned hollow tubular sealing member and having a tip of sufficiently small diameter that it may be projected into the inlet openings of said fittings at least in part and to make a sealing contact with the edge surrounding said inlet opening.

12. In high pressure lubricant dispensing apparatus for servicing lubricant-receiving fittings having inlet openings of relatively small diameter and having generally circular sealing portions of relatively larger diameter concentrically surrounding said inlet openings, means for making a sealed connection with said fitting including a generally hollow tubular sealing member having a concave contact surface for sealing engagement with said circular sealing portions of said fittings, and a generally tubular lubricant pressed sealing member reciprocable in said first-mentioned hollow tubular sealing member having a convex tip which may be projected into the inlet openings of said fittings at least in part and to make a sealing contact with the edge surrounding said inlet opening whereby the force with which said convex tip bears against the edge surrounding said inlet openings will be intensified by the pressure of the lubricant therein.

RUSSELL J. GRAY.